United States Patent
Baker et al.

(10) Patent No.: US 11,016,742 B2
(45) Date of Patent: May 25, 2021

(54) CHANNEL SIZING FOR INTER-KERNEL COMMUNICATION

(71) Applicant: Altera Corporation, San Jose, CA (US)

(72) Inventors: Alan Baker, Toronto (CA); Andrew Chaang Ling, Toronto (CA); Andrei Mihai Hagiescu Miriste, Toronto (CA)

(73) Assignee: Altera Corporation, San Jose, CA (US)

( * ) Notice: Subject to any disclaimer, the term of this patent is extended or adjusted under 35 U.S.C. 154(b) by 959 days.

(21) Appl. No.: 14/749,379

(22) Filed: Jun. 24, 2015

(65) Prior Publication Data
US 2016/0378441 A1 Dec. 29, 2016

(51) Int. Cl.
| G06F 8/41 | (2018.01) |
| G06F 8/40 | (2018.01) |
| G06F 30/34 | (2020.01) |
| G06F 30/327 | (2020.01) |
| G06F 115/08 | (2020.01) |
| G06F 9/54 | (2006.01) |

(52) U.S. Cl.
CPC .......... *G06F 8/41* (2013.01); *G06F 8/40* (2013.01); *G06F 9/54* (2013.01); *G06F 30/327* (2020.01); *G06F 30/34* (2020.01); *G06F 2115/08* (2020.01)

(58) Field of Classification Search
CPC .......... G06F 17/5054; G06F 8/40; G06F 8/41; G06F 9/54
See application file for complete search history.

(56) References Cited

U.S. PATENT DOCUMENTS

| 8,875,073 B1* | 10/2014 | Sundararajan | G06F 17/505 716/104 |
| 8,924,975 B2 | 12/2014 | Memik et al. | |
| 8,972,707 B2 | 3/2015 | Henry et al. | |
| 2005/0080874 A1* | 4/2005 | Fujiwara | H04L 67/1097 709/217 |
| 2013/0212365 A1* | 8/2013 | Chen | G06F 17/5054 713/1 |
| 2014/0098683 A1* | 4/2014 | Kumar | H04L 49/109 370/252 |

FOREIGN PATENT DOCUMENTS

EP 2677423 A2 12/2013

OTHER PUBLICATIONS

Altera: "Altera SDK for OpenCL Best Practices Guide", May 4, 2015 (May 4, 2015), pp. 1-80, XP055314069, Retrieved from the Internet: URL: https://www.altera.com/content/dam/altera-www/global/en_US/pdfs/literature/hb/opencl-sdk/archives/aocl-best-practices-guide-15.0.pdf.
Extended European Search Report for EP Application No. 16175374 dated Nov. 24, 2016.
Chinese Office Action for CN 2016104634541 with English translation; dated Jan. 2, 2019; pp. 1-26.

* cited by examiner

*Primary Examiner* — Jack Chiang
*Assistant Examiner* — Aric Lin
(74) *Attorney, Agent, or Firm* — Fletcher Yoder P.C.

(57) ABSTRACT

Systems and methods for dynamically sizing inter-kernel communication channels implemented on an integrated circuit (IC) are provided. Implementation characteristics of the channels, predication, and kernel scheduling imbalances may factor into properly sizing the channels for self-synchronization, resulting in optimized steady-state throughput.

14 Claims, 4 Drawing Sheets

CHANNEL SIZING FOR INTER-KERNEL COMMUNICATION

BACKGROUND

The present disclosure relates generally to integrated circuits, such as field programmable gate arrays (FPGAs). More particularly, the present disclosure relates to dynamic sizing of channels used for kernel communication on integrated circuits (e.g., FPGAs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs, according to a designer's design. Additionally, FPGAs may include input/output (I/O) logic, as well as high-speed communication circuitry. For instance, the high-speed communication circuitry may support various communication protocols and may include high-speed transceiver channels through which the FPGA may transmit serial data to and/or receive serial data from circuitry that is external to the FPGA.

In ICs such as FPGAs, the programmable logic is typically configured using low level programming languages such as VHDL or Verilog. Unfortunately, these low level programming languages may provide a low level of abstraction and, thus, may provide a development barrier for programmable logic designers. Higher level programming languages, such as OpenCL have become useful for enabling more ease in programmable logic design. The higher level programs are used to generate code corresponding to the low level programming languages. As used herein, kernels refer to a digital circuit that implements a specific function and/or program. Kernels may be useful to bridge the low level programming languages into executable instructions that may be performed by the integrated circuits. Each kernel implemented on the IC may execute independently and concurrently from the other kernels on the IC. Accordingly, OpenCL programs typically require at least a single hardware implementation for each kernel in the OpenCL program. Kernels may be individually balanced and data may flow from one kernel to another using one or more dataflow channels (e.g., First-in-first-out (FIFO) channels) between two kernels.

The dataflow channels may be varied in size to accept an appropriate amount of data to flow from one kernel to another. Traditionally, users specify a data capacity for the channels to account for a constrained execution model (e.g., single-treaded execution). Unfortunately, this user-specified capacity does not account for implementation details, because users typically only work with the higher level programs rather than the low level programming languages.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for enhancing performance of machine-implemented programs through automatic inter-kernel channel sizing based upon one or more factors. In particular, the present embodiments may provide dynamic channel sizing on integrated circuits (ICs, such as FPGAs) based upon the current implementation on the IC, predication, and/or scheduling imbalances. The automatic sizing may aim to increase data throughput between kernel executions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry for enhancing performance of machine-readable programs implemented on an integrated circuit (IC). In particular, inter-kernel communication channel sizing may be automatically modified based upon one or more factors. For example, these modifications may be made based upon a current program implementation on the IC, predication, and/or scheduling imbalances.

Figure 1:
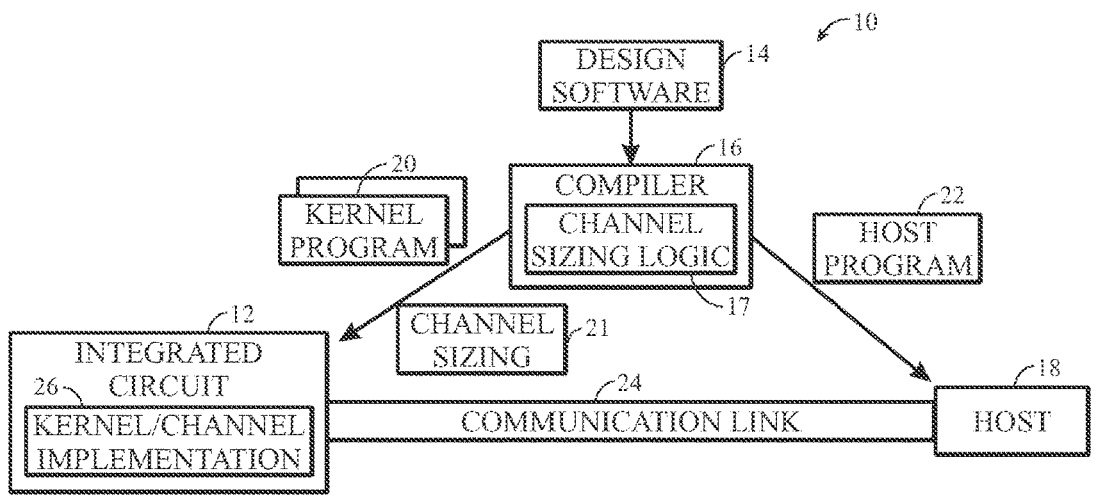
FIG. 1 is a block diagram of a system that utilizes channel sizing logic to affect a machine-implemented program, in accordance with an embodiment.

With the foregoing in mind, FIG. 1 illustrates a block diagram of a system 10 that utilizes channel sizing logic to affect a machine-implemented program. As discussed above, a designer may desire to implement functionality on an integrated circuit 12 (IC, such as a field programmable gate array (FPGA)). The designer may specify a high level program to be implemented, such as an OpenCL program, which may enable the designer to more efficiently and easily provide programming instructions to implement a set of programmable logic for the IC 12 without requiring specific knowledge of low level computer programming languages (e.g., Verilog or VHDL). For example, because OpenCL is quite similar to other high level programming languages, such as C++, designers of programmable logic familiar with such programming languages may have a reduced learning curve than designers that are required to learn unfamiliar low level programming languages to implement new functionalities in the IC.

The designers may implement their high level designs using design software 14, such as a version of Quartus by Altera™. The design software 14 may use a compiler 16 to convert the high level program into a low level program. Further, the compiler 16 (or other component of the system 10) may include channel sizing logic 17 that automatically sizes channels that will be implemented for inter-kernel communications between two or more kernels.

The compiler 16 may provide machine-readable instructions representative of the high level program to a host 18 and the IC 12. For example, the IC 12 may receive one or more kernel programs 20 which describe the hardware implementations that should be stored in the IC. Further, channel sizing definitions 21 may be provided by the channel sizing logic 17, which may automatically define a sizing of channels between the one or more kernel programs 20. As mentioned above, the automatic sizing may be based upon a variety of factors including: program implementation, predication, and/or kernel scheduling imbalances. Sizing of the channels based upon these factors will be discussed in more detail below.

The host 18 may receive a host program 22 which may be implemented by the kernel programs 20. To implement the host program 22, the host 18 may communicate instructions from the host program 22 to the IC 12 via a communications link 24, which may be, for example, direct memory access (DMA) communications or peripheral component interconnect express (PCIe) communications. Upon receipt of the kernel programs 20 and the channel sizing definition 21, a kernel and/or channel implementation may be executed on the on the IC 16 and controlled by the host 18. As will be described in more detail below, the host 18 may add, remove, or swap kernel programs 20 from the adapted logic 26, such that execution performance may be enhanced.

Figure 2:
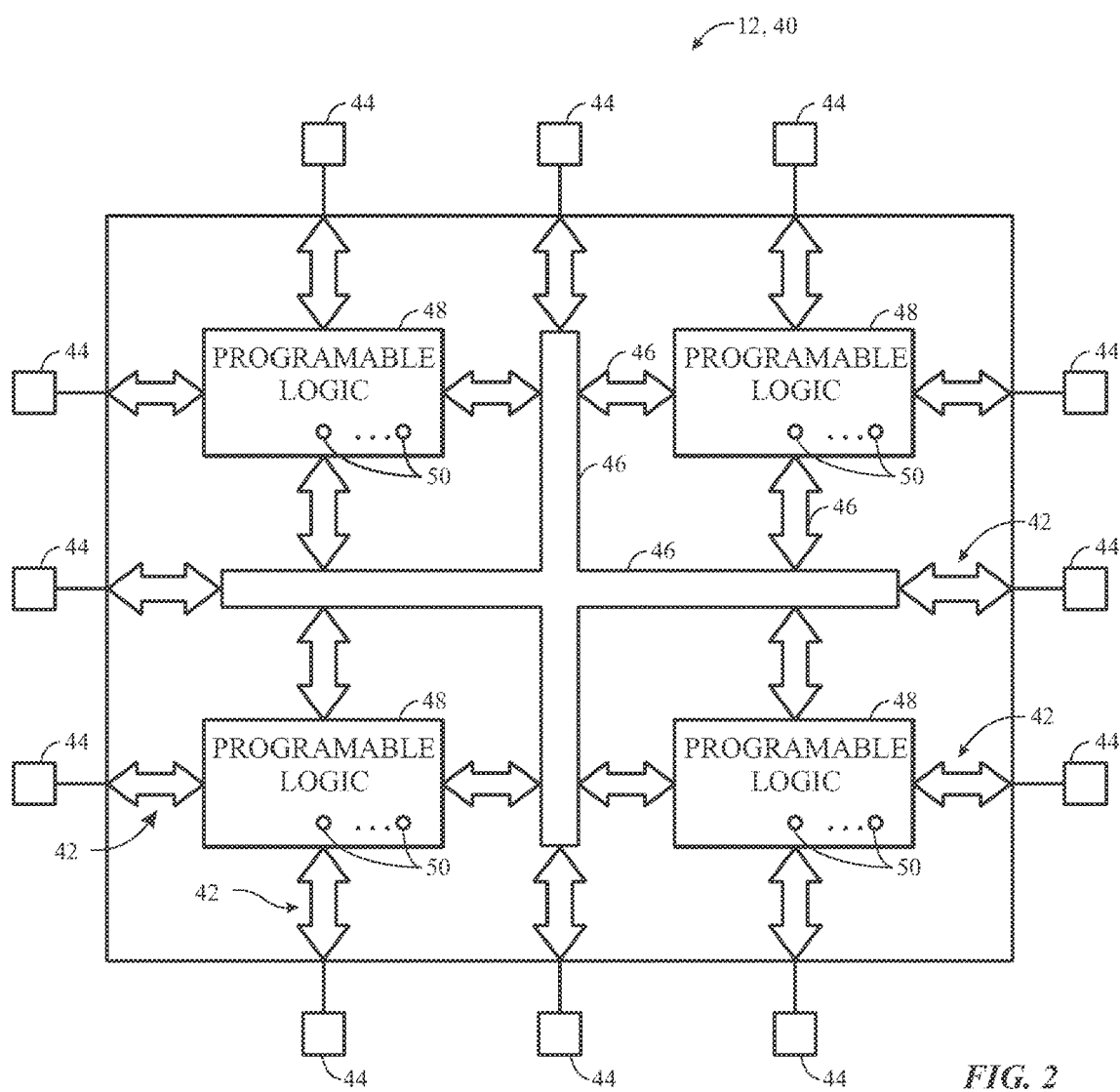
FIG. 2 is a block diagram of a programmable logic device that may include logic useful for implementing the channel sizing logic, in accordance with an embodiment.

Turning now to a more detailed discussion of the IC 12, FIG. 2 illustrates an IC device 12, which may be a programmable logic device, such as a field programmable gate array (FPGA) 40. For the purposes of this example, the device 40 is referred to as an FPGA, though it should be understood that the device may be any type of programmable logic device (e.g., an application-specific integrated circuit and/or application-specific standard product). As shown, FPGA 40 may have input/output circuitry 42 for driving signals off of device 40 and for receiving signals from other devices via input/output pins 44. Interconnection resources 46, such as global and local vertical and horizontal conductive lines and buses, may be used to route signals on device 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48. As discussed in further detail below, the FPGA 40 may include adaptable logic that enables partial reconfiguration of the FPGA 40, such that kernels may be added, removed, and/or swapped during the runtime of the FPGA 40.

Programmable logic devices, such as FPGA 40, may contain programmable elements 50 with the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Most programmable logic devices are electrically programmed. With electrical programming arrangements, the programmable elements 50 may be formed from one or more memory cells. For example, during programming, configuration data is loaded into the memory cells 50 using pins 44 and input/output circuitry 42. In one embodiment, the memory cells 50 may be implemented as random-access-memory (RAM) cells. The use of memory cells 50 based on RAM technology is described herein is intended to be only one example. Further, because these RAM cells are loaded with configuration data during programming, they are sometimes referred to as configuration RAM cells (CRAM). These memory cells 50 may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

The circuitry of FPGA 40 may be organized using any suitable architecture. As an example, the logic of FPGA 40 may be organized in a series of rows and columns of larger programmable logic regions, each of which may contain multiple smaller logic regions. The logic resources of FPGA 40 may be interconnected by interconnection resources 46 such as associated vertical and horizontal conductors. For example, in some embodiments, these conductors may include global conductive lines that span substantially all of FPGA 40, fractional lines such as half-lines or quarter lines that span part of device 40, staggered lines of a particular length (e.g., sufficient to interconnect several logic areas), smaller local lines, or any other suitable interconnection resource arrangement. Moreover, in further embodiments, the logic of FPGA 40 may be arranged in more levels or layers in which multiple large regions are interconnected to form still larger portions of logic. Still further, device arrangements may use logic that is arranged in a manner other than rows and columns.

As discussed above, the FPGA 40 may allow a designer to create a customized design capable of executing and performing customized functionalities. Each design may have its own hardware implementation to be implemented on the FPGA 40. For instance, a single hardware implementation is needed for each kernel in a design for the FPGA 40. Further, one or more channels may be implemented for inter-kernel communication. In some embodiments, these channels may include one or more first-in-first-out (FIFO) buffers useful for data flow between two or more kernels. The inter-kernel communication channels may be automatically sized based upon a variety of factors, as described in more detail below.

Figure 3:
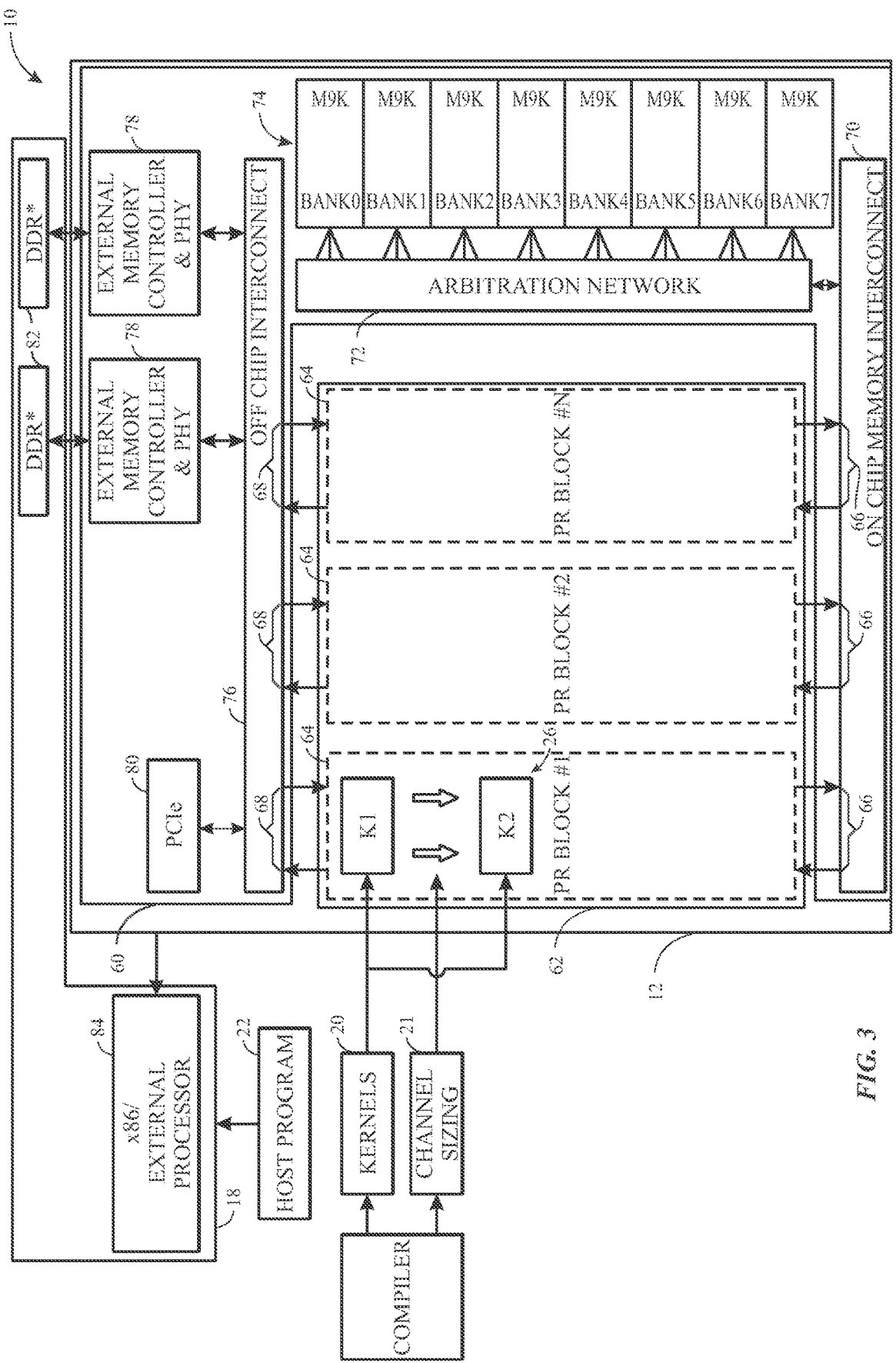
FIG. 3 is a block diagram illustrating elements of the host and integrated circuit of FIG. 1, in accordance with an embodiment.

Referring now to FIG. 3, a block diagram illustrating the system 10, further detailing elements of the host 18 and IC 12 of FIG. 1 is provided. As illustrated, the IC 12 may include fixed components 60 and configurable components 62. Some ICs, such as a Stratix® V FPGA by Altera®, provide partial reconfiguration capabilities. For example, in some embodiments, the configurable components may include a number (N) of partial reconfiguration (PR) blocks 64 stored on an IC12 (such as FPGA 40 of FIG. 2). The PR blocks 64 may prove an ability to reconfigure part of the IC 12 while the rest of the device continues to work. The PR blocks 64 may include ports to both on-chip memory interconnects and off-chip interconnects (ports 66 and 68, respectively). The PR blocks 64 are not restricted to a particular protocol; however, each of the PR blocks 64 within an IC 12 may agree on a common protocol. For example, each of the PR blocks 64 may use the Avalon® Memory-Mapped (Avalon-MM) interface, which may allow easy interconnection between components in the IC 12.

The size and number of PR blocks 64 may be defined by the hardware implementations and amount of programmable logic available on the IC 12. For example, the hardware implementations 26 for each kernel 20 and/or inter-kernel communication channel 21 may be placed in one or more PR block 64. In certain embodiments, the hardware implementations 26 may be placed in programmable logic that is not a partial reconfiguration block 64. For example, the kernels 20 and/or the channel definitions (e.g., channel sizing 21) may be provided by the compiler 16 (e.g., utilizing the channel sizing logic 17 of FIG. 1).

Turning now to a discussion of the fixed logic 60, the fixed logic 60 may include an on-chip memory interconnect 70, an arbitration network 72, local memory 74, an off-chip interconnect 76, external memory and physical layer controllers 78, and/or a PCIe bus 80. The on-chip memory interconnect 70 may connect to the PR blocks 64 over the on-chip memory interconnect ports 66 of the PR blocks 64. The on-chip memory interconnect 70 may facilitate access between the PR blocks 64 and the local memory 74 via the arbitration network 72. Further, the off-chip memory interconnect 76 may connect to the PR blocks 64 over the off-chip memory interconnect ports 68 of the PR blocks 64. The off-chip interconnect 76 may facilitate communications between the PR blocks 64 and the host communications components (e.g., the external memory and physical layer controllers 78 and the PCIe bus 80). The external memory and physical layer controllers 78 may facilitate access between the IC 12 and external memory (e.g., host 18 memory 82). Further the PCIe bus 80 may facilitate communication between the IC 12 and an external processor (e.g., host 12 processor 84). As will become more apparent, based on the discussion that follows, communications between the host 18 and the IC 12 may be very useful in enabling adaptable logic on the IC 12.

Figure 4:
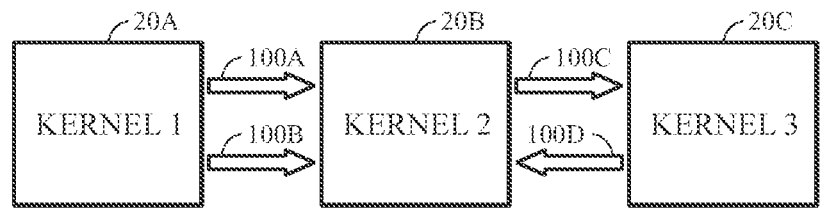
FIG. 4 is a block diagram illustrating inter-kernel communication using a plurality of automatically sized channels, in accordance with an embodiment.

FIG. 4 is a block diagram illustrating an example of a kernel and automatically sized channel implementation 26, in accordance with an embodiment. The implementation 26 example of FIG. 4 includes three kernels 20A, 20B, and 20C. Output of kernel 20A is forwarded to kernel 20B via two inter-kernel communication channels 100A and 100B. Further, output of kernel 20B is provided to kernel 20C via inter-kernel communication channel 100C. Output from kernel 20C is provided, as input, to kernel 20B via inter-kernel communication channel 100D.

Each of the channels 100A, 100B, 100C, and 100D may be automatically sized based upon one or more factors. A variety of channel 100A-100D implementations may be implemented. For example, channels 100A-100D may be implemented on the IC using registers, using low-latency components, using high-latency components, using Block random access memory (RAM) (e.g., dedicated RAM), etc. The latency of the channels 100A-100D may vary, depending on the architecture of the implementation of these channels 100A-100D. The latency of the channels 100A-100D may impact throughput, and thus, is one implementation factor that may be used for automatic sizing of the channels 100A-100D. Latency is defined herein as the number of cycles it takes for the data of a write of a channel (e.g., channel 100A-100D) to be read at the other end of the channel 100A-100D. In other words, the latency is the number of cycles it takes for a "not-full" state to propagate to the write site of a channel (e.g., channel 100A-100D). To insure proper sizing of the channels 100A-100D, the depth of the channels 100A-100D may be sized such that their depth is greater than the latency of the channels 100A-100D. For example, the compiler (e.g., compiler 16 of FIG. 1) may determine a latency of the channel 100A-100D implementations and/or may retrieve a known latency of the channels 100A-100D based upon an ascribed latency for channel implementations. The compiler may ensure that the sizing of the channels 100A-100D are greater than their corresponding latencies. This may help to ensure that data is not requested prior to a time when it propagates to the other end of the channels 100A-100D. In some embodiments, the compiler may first determine a desirable channel depth and select a channel implementation based on the determined desirable channel depth (e.g., by selecting a channel implementation that has a lower latency than the desirable channel depth). Regardless of whether the implementation latency determines the depth of the channel or the desired channel depth determines the channel implementation, the compiler may maintain a relationship where the depth of the channels is greater than the latency of the implementation.

Alternative factors for automatic sizing may include predication and/or scheduling imbalances. For example, channel implementation factors, such as the channel 100A-100D latency may impact throughput of the channels 100A-100D. Predication (the channel read and/or writes are not executed every execution cycle) may affect throughput in inter-kernel communication. For example, stalls may occur when an attempt is made to write into a full channel 100A-100D. The length of the stall is the time it takes for the channel 100A-100D to become "not-full" at the location where the write is to occur (e.g., the latency of the channel 100A-100D). To counteract stalls, extra depth may be automatically added to the channels 100A-100D to account for the latency of the channels 100A-100D, as will be discussed in more detail with regard to FIG. 5.

Figure 5:
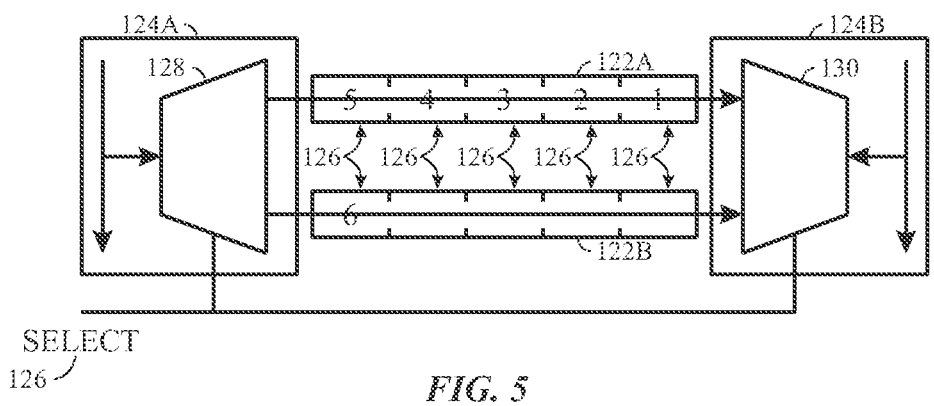
FIG. 5 is a block diagram illustrating automatic sizing of channels based upon predication, in accordance with an embodiment.

Turning now to a predication example 120, FIG. 5 is a block diagram illustrating automatic sizing of channels 122A and/or 122B based upon predication, in accordance with an embodiment. In the example 120, the kernels 124A and 124B are communicatively connected via FIFO-buffer-based channels 122A and 122B. The kernels 122A and 122B use the same selection logic 126 for the multiplexer (MUX) 128 of kernel 124A and the de-multiplexer (DEMUX) 130 of kernel 124B.

The MUX 128 and DEMUX 130 illustrate shared predication logic on the two channels 122A and 122B. For example, the selected outputs of the MUX 128 are provided to the DEMUX 130 via either channel 122A or channel 122B. Because the selection logic 126 may result in reads and/or writes of the channels 122A and/or 122B not executing every cycle (e.g., they are predicated), stalls may occur (e.g., when attempting to write into a full channel 122A and/or 122B. For instance, in the current example, each of the channels 122A and 122B has a capacity of 5 elements, as illustrated by the element containers 126. If the selection logic results in the first five elements being written to channel 122A, the sixth element being written to channel 122B, and the seventh element back to channel 122A, a stall will occur at the seventh write. The stall occurs because the seventh element cannot be written to channel 122A, which is full with elements 1-5, because kernel 124B received data from channel 122B when the sixth element was written, due to the selection logic 126 for the MUX 128 and DEMUX 130 being the same.

In other words, a control signal from the channel 122A indicating that it is "not full" will not reach the kernel 124A prior to the attempt to write the seventh data element, due to latency of the channel 122A. Accordingly, when the kernel 124A attempts to write the seventh data element, it will see the channel 122A as full, resulting in a stall.

To counteract the stalls, the channels 122A and/or 122B may be automatically sized (e.g., via the channel sizing logic 17 of FIG. 1) to include enough space for the implemented channel capacity (e.g., here, five elements) plus the latency of the channel 122A and/or 122B. As mentioned above, the latency of the channels 122A and/or 122B is defined at the number of cycles it takes for the data of a write to a channel 122A and/or 122B to be read at the other end of the channel 122A and/or 122B. In other words, the latency is the time it takes for the "not-full" state to propagate to the write site of a channel. Accordingly, in the current example, additional elements may be added to the channels 122A, because the selection logic 126, on the seventh write attempt, selects data from the channel 122A for reading at the DEMUX 130, resulting in an empty element container 126 in one cycle. By adding the latency to the implemented capacity, potential stalls due to predication may be avoided.

Automatic channel sizing may also account for scheduling imbalances in the kernels, such that throughput efficiencies may be realized. As mentioned above, each of the kernels may be independently balanced. Indeed, small portions of the kernels may be individually scheduled to create an efficient runtime. Because each of the kernels includes its own schedulings and/or latencies and because scheduling all of the inter-communicating kernels together as a single entity would result in significant runtime increases, the channels may be sized to accommodate kernel-based scheduling imbalances.

Figure 6:
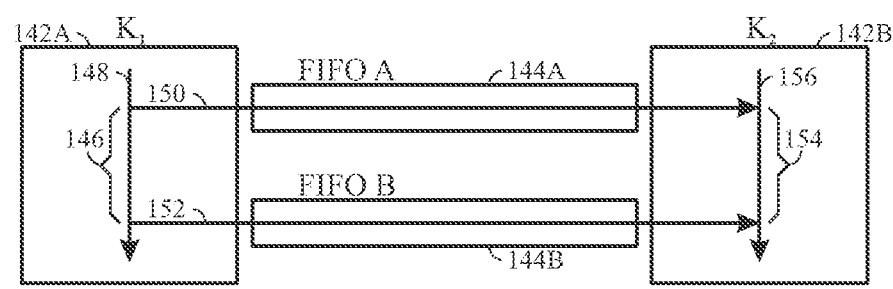
FIG. 6 is a block diagram illustrating automatic sizing of channels based upon scheduling imbalances, in accordance with an embodiment.
Figure 7:
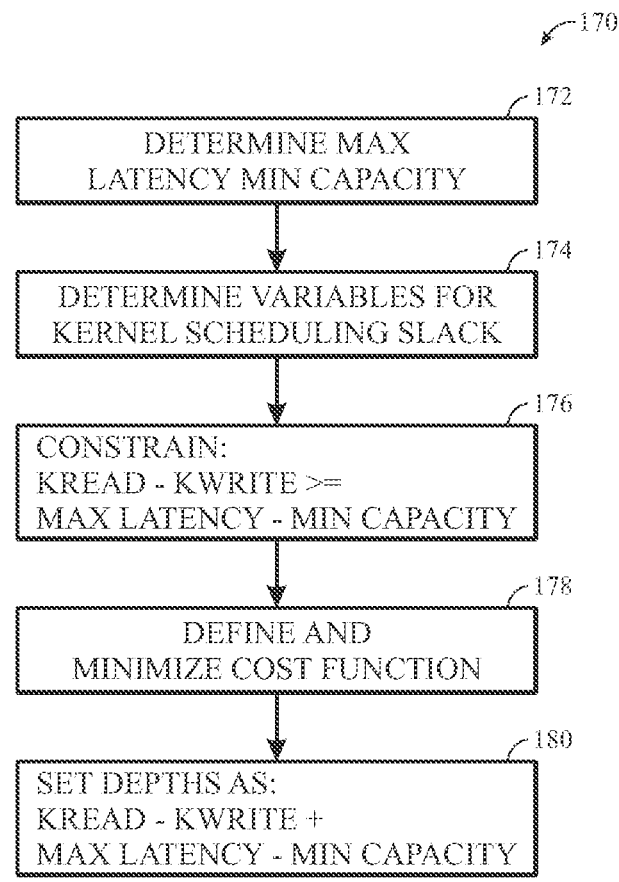
FIG. 7 is a process for solving an integer linear programming problem to determine an automatic channel depth, in accordance with an embodiment.

FIG. 6 is a block diagram illustrating an example 140 of automatic sizing of channels based upon scheduling imbalances, in accordance with an embodiment. FIG. 7 is a process for solving an integer linear programming problem to define a depth of the channels. FIGS. 6 and 7 will be discussed together for clarity.

In the example 140 of FIG. 6, a first kernel 142 provides data to a second kernel 142B via two channels (e.g., FIFO-buffer-based channels 144A and 144B). There is latency 146 between kernel 142A writes to the buffers 144A and 144B. For example, as data flows through kernel 142A (as illustrated by the arrow 148), data is first written to the channel 144A (as illustrated by the arrow 150). Data continues to flow for the latency 146 period (as illustrated by arrow 148) and a second piece of data is written to the channel 144B (as illustrated by arrow 152).

As may be appreciated, there is also a corresponding latency 154 between kernel 142B's reading of data from the channels 144A and 144B. For example, as data flows in kernel 142B (as illustrated by arrow 156), data is first read from the channel 144A (as indicated by arrow 150). Data flow continues for the latency 154 period (as illustrated by arrow 156). After the latency 154 period, a second data read occurs from the channel 144B (as illustrated by arrow 152).

To size the channels, the compiler may first calculate the maximum latency and the minimum capacity for each endpoint of the channel (e.g., each read and write site) (block 172 of FIG. 7). This latency is the amount of time it would take a thread to reach this endpoint from the start of the kernel. The minimum capacity is the minimum number of threads that could be live along that path prior to the endpoint. In other words, the latency is the amount of time it takes a thread to reach a certain point and the capacity is the number of threads that can be in a pipeline.

Next, a variable is used to represent any scheduling slack for the kernel (block 174 of FIG. 7). The slack may represent a delayed start of the kernel relative to other kernels. As the kernels start up, there may be some initial stalls, because kernels may be waiting for initial data to be processed by a predecessor kernel. However, in steady-state operation, stalls may be minimized and/or removed.

Next, a constraint is added for each channel (block 176 of FIG. 7). The constraint states that the slack for the kernel on the read side of the channel minus the slack of the kernel on the write side should be greater than or equal to the maximum latency it takes to get to the read minus the minimum capacity on the write side. In other words, this constraint calculates the number of threads that need to be held in the channel, in the worst case, when one kernel is able to consume more threads than another.

A cost function is then calculated for each pipeline, using the width of the channel (block 178 of FIG. 7). For example, if one channel sends 32 bits of data and another sends 512 bits of data, it would be much more expensive to create depth on the 512 bits of data.

The depths of the channels may then be set (block 180 of FIG. 7). The depth may be the relative difference between the read and write endpoints of the kernels plus the difference between the maximum latency and the minimum capacity.

Figure 8:
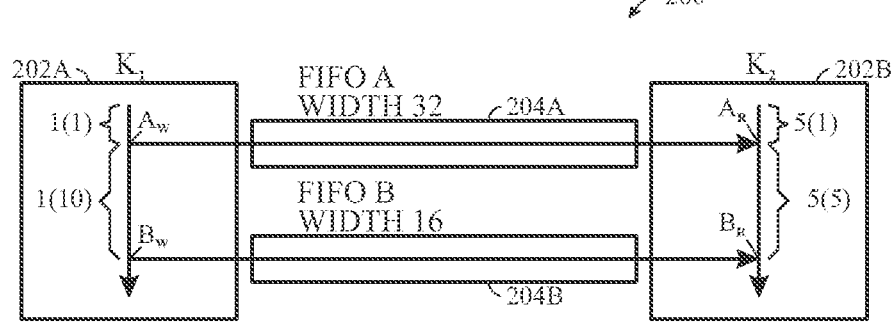
FIG. 8 is a block diagram illustrating automatic sizing of channels using integer linear programming (ILP), in accordance with an embodiment.

FIG. 8 is a block diagram 200 illustrating automatic sizing of channels using integer linear programming (ILP), in accordance with an embodiment. The cost function may be minimized, resulting in an implementation that uses a minimal area of the IC programmable logic.

In the block diagram 200, there are two kernels $k_1$ 202A and $k_2$ 202B. Channel 204A is named FIFO A and has a width of 32 bits. Channel 204B is named FIFO B and has a width of 16 bits. Point $A_w$ is where writes to FIFO A 204A occur. Point $A_r$ is where reads from FIFO A 204A occur. Point $B_w$ is where writes to FIFO B 204B occur and point $B_r$ is where reads from FIFO B occur. The format m(n) may represent the maximum latency and the minimum capacity to the specific point in the kernel 202A and/or 202B. For example 5(10) may represent a maximum latency of 55 and a minimum capacity of 10 at a particular point. Thus, at $A_w$, both the maximum latency and the minimum capacity are 1. At $B_w$, the maximum latency is 1 and the minimum capacity is 10. At $A_r$, the maximum latency is 5 and the minimum capacity is 1. At $B_r$, the maximum latency and the minimum capacity are both 5. These values may be determined, for example, by the compiler during runtime.

To solve the ILP problem, the cost of kernel $k_1$ 202A is determined as $-32+(-16)=-48$ and the cost of kernel $k_2$ 202B is determined as $32+16=48$. The cost function ($-48 k_1 + 48 k_2$) is then minimized. FIFO A channel 204A constraint ($k_2-k_1>=5-1>=-4$) is added. Additionally FIFO B channel 204B constraint ($k_2-k_1>=10-5>=5$) is added. Then, to make the problem solvable, a dummy node (e.g. "source") is created and additional constraints $k_1$−source$>=1000000$ and source−$k_2>=1000000$ are added. While the current example uses 1000000, any large cost factor may be used. The cost factor may be large, such that they have a negligible effect on the solution of this equation. Then, the ILP problem is solved to get $k_2-k_1=5$. This difference is used in the depth calculation of FIFO A channel 204A and FIFO B channel 204B. The depth of FIFO A channel 204A may be set to 5+5−1=9 and the depth of FIFO B channel 204B may be set to 5+5−10=0.

By implementing the automatic channel sizing logic, inter-kernel channel communication throughput may be enhanced. For example, if the sizing of the channels does not account for implementation factors, predication, and/or scheduling imbalances, a write attempt may occur to a full inter-kernel communication channel. This may result in an unnecessary data stall, reducing throughput. Accordingly, by allowing the compiler (or other component) automatically size these channels based upon the various implementation factors, predication, and/or scheduling imbalances, throughput efficiencies may be obtained.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A tangible, non-transitory, machine-readable-medium, comprising machine readable instructions to:
   access, via a compiler, a high level program comprising instructions to be programmed on an integrated circuit;
   convert, via the compiler, the high level program into a low level program to be implemented on the integrated circuit, wherein the low level program comprises a first kernel, a second kernel, and an inter-kernel channel that enables inter-channel communication between the first kernel and the second kernel; wherein the first kernel and the second kernel each comprise a digital circuit implementation that bridge the low level program and executable instructions to be performed by the integrated circuit;
   identify, via the compiler: a latency of the inter-kernel channel, predication between the first kernel and the second kernel, a scheduling imbalance between data processing of the first kernel and data processing of the second kernel, or any combination thereof;
   modify, via the compiler, a size of the inter-kernel channel, by:
      adding additional depth to the inter-kernel channel until a depth of the inter-kernel channel is greater than the latency;
      adding additional depth to the inter-kernel channel until the depth of the inter-kernel channel includes enough space to store an implemented channel capacity and additional data received during an amount of time equal to the latency;
      adjusting the depth of the inter-kernel channel based upon a calculation of a number of threads that need to be held in the inter-kernel channel, in the worst case, when one of the first kernel or the second kernel is able to consume more threads than the other;
      or any combination thereof; and
   provide, via the compiler, the low level program with the modified size of the inter-kernel channel to the integrated circuit for implementation on the integrated circuit;
   wherein the inter-kernel channel is sized based upon the predication of the inter-kernel channel reads, inter-kernel channel writes, or both.

2. The machine-readable-medium of claim 1, wherein the instructions to size the inter-kernel channel comprise instructions to:
   size the inter-kernel channel based upon a latency of the inter-kernel channel.

3. The machine-readable-medium of claim 2, wherein the instructions to size the inter-kernel channel comprise instructions to:
   size the inter-kernel channel, such that a minimum depth of the inter-kernel channel is greater than the latency of the inter-kernel channel.

4. The machine-readable-medium of claim 1, wherein the instructions to size the inter-kernel channel comprise instructions to:
   size the inter-kernel channel, such that a capacity of the inter-kernel channel is equal to or greater than an initial capacity of the inter-kernel channel plus a latency of the inter-kernel channel.

5. The machine-readable-medium of claim 1, wherein the instructions to size the inter-kernel channel comprise instructions to:
   size the inter-kernel channel based upon at least two of: a latency of the inter-kernel channel, predication, and scheduling imbalances of the first and second kernels.

6. The machine-readable-medium of claim 1, wherein the low level program comprises a plurality of inter-kernel channels, and the machine readable instructions comprise instructions to size two or more of the plurality of inter-kernel channels, the sizing, based upon a latency of a respective inter-kernel channel being sized, predication of the respective inter-kernel channel being sized, scheduling imbalances between kernels at endpoints of the respective inter-kernel channel being sized, or any combination thereof.

7. A tangible, non-transitory, machine-readable-medium, comprising machine readable instructions to:
  access, via a compiler, a high level program comprising instructions to be programmed on an integrated circuit;
  convert, via the compiler, the high level program into a low level program to be implemented on the integrated circuit, wherein the low level program comprises a first kernel, a second kernel, and an inter-kernel channel that enables inter-channel communication between the first kernel and the second kernel; wherein the first kernel and the second kernel each comprise a digital circuit implementation that bridge the low level program and executable instructions to be performed by the integrated circuit;
  identify, via the compiler: a scheduling imbalance between data processing of the first kernel and data processing of the second kernel;
  modify, via the compiler, a size the inter-kernel channel based upon scheduling imbalances between the first kernel and the second kernel, by:
    adjusting a depth of the inter-kernel channel based upon a calculation of a number of threads that need to be held in the inter-kernel channel, in the worst case, when one of the first kernel or the second is able to consume more threads than the other; and
  provide, via the compiler, the low level program with the modified size of the inter-kernel channel to the integrated circuit for implementation on the integrated circuit;
  wherein the instructions to size the inter-kernel channel comprise instructions to:
    construct an integer linear programming problem to size the inter-kernel channel, by:
      determining a maximum latency to reach a read portion of the inter-kernel channel (hereinafter max_latency(read));
      determining a maximum latency to reach a write portion of the inter-kernel channel (hereinafter max_latency(write));
      determining a minimum capacity that can be live prior to a read at the inter-kernel channel (hereinafter min_capacity(read));
      determining a minimum capacity that can be live prior to a write to a kernel from the inter-kernel channel (hereinafter min_capacity(write));
      determining a first kernel scheduling slack variable, the first kernel scheduling slack variable representing a delayed start of the first kernel relative to the second kernel;
      determining a second kernel scheduling slack variable, the second kernel scheduling slack variable representing a delayed start of the second kernel relative to the first kernel;
      applying a constraint for the inter-kernel channel, such that a slack variable from the first kernel scheduling slack variable or the second kernel scheduling slack variable corresponding to a reading kernel minus a slack variable from the first kernel scheduling slack variable or the second kernel scheduling slack variable corresponding to a writing kernel is greater than or equal to the max_latency(read) minus the min_capacity (write);
      defining and minimizing a cost function for the first kernel and the second kernel, wherein the cost function for the first kernel and the second kernel is defined as a sum of widths of all inter-kernel channels having a read in the respective first kernel or second kernel minus a sum of all inter-kernel channels having a write in the respective first kernel or second kernel; and
      setting a depth of the inter-kernel channel to equal to the slack variable for the reading kernel minus the slack variable for the writing kernel plus max_latency(read) minus min_capacity(write).

8. An integrated circuit (IC) device comprising:
  programmable logic comprising an implementation of one or more inter-kernel channels that communicatively couple first and second kernels that each comprise a digital circuit implementation that bridge a low level program and executable instructions to be performed by the integrated circuit;
  wherein at least a subset of the one or more inter-kernel channels was sized by a compiler or programmable logic design software based upon predication of a respective inter-kernel channel being sized, by:
    identifying: a latency of the one or more inter-kernel channels, predication between the first kernel and the second kernel, a scheduling imbalance between data processing of the first kernel and data processing of the second kernel, or any combination thereof; and
    adding additional depth to the inter-kernel channel until a depth of the inter-kernel channel is greater than the latency;
    adding additional depth to the inter-kernel channel until the depth of the inter-kernel channel includes enough space to store an implemented channel capacity and additional data received during an amount of time equal to the latency;
    adjusting the depth of the inter-kernel channel based upon a calculation of a number of threads that need to be held in the inter-kernel channel, in the worst case, when one of the first kernel or the second is able to consume more threads than the other;
  or any combination thereof.

9. The IC device of claim 8, wherein the programmable logic comprises at least one partial reconfiguration (PR) block comprising a physical location on the IC that can be reconfigured during runtime of the IC.

10. The IC device of claim 8, wherein at least a subset of the one or more inter-kernel channels comprise a first-in-first-out (FIFO) buffer.

11. The IC device of claim 8, wherein the at least a subset of the one or more inter-kernel channels is sized based upon a latency of a respective inter-kernel channel being sized.

12. The IC device of claim 8, wherein the at least a subset of the one or more inter-kernel channels is sized based upon scheduling imbalances of kernels connected to a respective inter-kernel channel being sized.

13. The IC device of claim 8, wherein the at least a subset of the one or more inter-kernel channels is sized based upon a latency of a respective inter-kernel channel being sized, predication of the respective inter-kernel channel being sized, and scheduling imbalances of kernels connected to the respective inter-kernel channel being sized.

14. A method, comprising:
    identifying, via a compiler: a latency of one or more inter-kernel channels, predication between a first kernel and a second kernel, a scheduling imbalance between data processing of the first kernel and data processing of the second kernel, or any combination thereof, wherein the one or more inter-kernel channels communicatively couple the first kernel to the second kernel and the first kernel and the second kernel each comprise a digital circuit implementation that bridge a low level program and executable instructions to be performed by an integrated circuit;
    sizing, via the compiler, one or more inter-kernel channels, by:
        adding additional depth to the inter-kernel channel until a depth of the inter-kernel channel is greater than the latency;
        adding additional depth to the one or more inter-kernel channels until the depth of the inter-kernel channel includes enough space to store an implemented channel capacity and additional data received during an amount of time equal to the latency;
        adjusting the depth of the one or more inter-kernel channels based upon a calculation of a number of threads that need to be held in the inter-kernel channel, in the worst case, when one of the first kernel or the second is able to consume more threads than the other; or
        any combination thereof; and
    providing, via the compiler, sizing information regarding the sizing to an integrated circuit for implementation of the inter-kernel channel on the integrated circuit, according to the sizing;
    wherein the sizing of the one or more inter-kernel channels is based upon a latency of a respective inter-kernel channel being sized, predication of the respective inter-kernel channel being sized, scheduling imbalances of kernels connected to the respective inter-kernel channel being sized, or any combination thereof; and the method further comprising sizing at least one inter-kernel channel based upon the scheduling imbalances using an integer linear programming problem, by:
        determining a maximum latency to reach a read portion of the at least one inter-kernel channel (hereinafter max_latency(read));
        determining a maximum latency to reach a write portion of the at least one inter-kernel channel (hereinafter max_latency(write));
        determining a minimum capacity that can be live prior to a read at the at least one inter-kernel channel (hereinafter min_capacity(read));
        determining a minimum capacity that can be live prior to a write to a kernel from the at least one inter-kernel channel (hereinafter min_capacity(write));
        determining a first kernel scheduling slack variable, the first kernel slack variable representing a delayed start of a first kernel relative to a second kernel, where the first kernel and second kernel are associated with the at least one inter-kernel channel;
        determining a second kernel scheduling slack variable, the second kernel slack variable representing a delayed start of the second kernel relative to the first kernel;
        applying a constraint for the at least one inter-kernel channel, such that a slack variable from the first kernel scheduling slack variable or the second kernel scheduling slack variable corresponding to a reading kernel minus a slack variable from the first kernel scheduling slack variable or the second kernel scheduling slack variable corresponding to a writing kernel is greater than or equal to the max_latency(read) minus the min_capacity(write);
        defining and minimizing a cost function for the first kernel and the second kernel, wherein the cost function for the first kernel and the second kernel is defined as a sum of widths of all inter-kernel channels having a read in the respective first kernel or second kernel minus a sum of all inter-kernel channels having a write in the respective first kernel or second kernel; and
        setting a depth of the at least one inter-kernel channel to equal to the slack variable for the reading kernel minus the slack variable for the writing kernel plus max_latency(read) minus min_capacity(write).

* * * * *